(54) FUZZY BLACK COLOR CONVERSION USING WEIGHTED OUTPUTS AND MATCHED TABLES

(75) Inventors: Stuart A. Schweid, Pittsford, NY (US); Jeng-nan Shiau, Webster, NY (US); Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/401,378

(22) Filed: Sep. 22, 1999

(51) Int. Cl.[7] .............................. G06F 15/00; G03F 3/08
(52) U.S. Cl. ......................................... 358/1.9; 358/523
(58) Field of Search ......................... 358/1.9, 2.1, 3.02, 358/3.23, 518, 515, 520, 522, 521, 523, 162, 167

(56) References Cited

U.S. PATENT DOCUMENTS

| | | | |
|---|---|---|---|
| 5,146,328 A | | 9/1992 | Yamasaki et al. ............ 358/164 |
| 5,260,804 A | * | 11/1993 | Fukutomi et al. ............ 358/444 |
| 5,321,525 A | * | 6/1994 | Hains ............................ 358/456 |
| 5,347,369 A | | 9/1994 | Harrington ................... 358/401 |
| 5,359,437 A | | 10/1994 | Hibi .............................. 358/529 |
| 5,414,529 A | * | 5/1995 | Terada et al. ................ 358/448 |
| 5,471,313 A | | 11/1995 | Thieret et al. ............... 358/296 |
| 5,481,372 A | * | 1/1996 | Kouno et al. ................ 358/433 |
| 5,515,172 A | | 5/1996 | Shiau .......................... 358/298 |
| 5,543,896 A | | 8/1996 | Mestha ........................ 355/208 |
| 5,719,956 A | | 2/1998 | Ogatsu et al. ............... 382/167 |
| 5,749,020 A | | 5/1998 | Mestha et al. ................. 399/49 |
| 5,751,862 A | * | 5/1998 | Williams et al. ............ 382/260 |
| 5,765,029 A | | 6/1998 | Schweid et al. ............... 395/61 |
| 5,768,403 A | * | 6/1998 | Suzuki et al. ................ 382/165 |
| 5,777,656 A | | 7/1998 | Henderson ................... 347/251 |
| 5,778,156 A | | 7/1998 | Schweid et al. ............... 395/61 |
| 5,787,193 A | | 7/1998 | Balasubramanian ........ 382/167 |
| 6,181,829 B1 | * | 1/2001 | Clark et al. ................. 382/273 |
| 6,347,153 B1 | * | 2/2002 | Triplett et al. .............. 382/224 |

\* cited by examiner

*Primary Examiner*—Madeleine Nguyen
(74) *Attorney, Agent, or Firm*—Fay, Sharpe, Fagan, Minnich & McKee, LLP

(57) ABSTRACT

A color conversion table designed to produce 0% under-color removal and a 100% under-color removal TRC are configured as a matched pair and are used to render an image from fuzzy detected color signals, including providing variable under-color removal to obtain fuzzy black conversion. The output of the color conversion table and the TRC are multiplied by a weighted value which depends on a value of a received neutral tag. The weighted outputs of the color conversion table and TRC are added such that a varying weighted output is generated. The generated output is used in image rendering to produce a smooth transition from a full color to monochrome, where variable amounts of under-color removal are obtained using the color correction table and TRC.

18 Claims, 2 Drawing Sheets

FUZZY BLACK COLOR CONVERSION USING WEIGHTED OUTPUTS AND MATCHED TABLES

BACKGROUND OF THE INVENTION

The present invention relates to the digital color image processing arts. It finds particular application in conjunction with rendering of an image including use of a variable under-color correction system, and will be described with particular reference thereto. However, it is to be appreciated that the invention is applicable to other image rendering applications.

Color in printed digital images results from the combination of a limited set of colors over a small area in densities selected to integrate the desired color response. This is accomplished in many printing devices by reproducing so called "separations" of the image, where each separation provides varying gray values of a single primary color. When the separations are combined together, the result is a full color image.

The particular color of each separation depends on the "color-space" being implemented. Examples of color space models include, RGB, CMY, CMYK, Lab, Yes, YIQ, HSV, HLS.

In practice, color images are commonly printed in a cyan-magenta-yellow-black (CMYK) color-space. This color-space is based upon the CMY color-space, but attempts to improve the quality of "black" in the image and reduce use of color inks. In theory, images can be printed using the CMY color space, with a mixture of the three colors producing black. In practice, however, printing with only cyan, magenta, and yellow inks often does not produce the highest quality black, but instead results in a muddy brownish output due to impurities in the inks, the particular paper or other image recording media used, and the partial reflection of light instead of its complete absorption into the inks. Furthermore, select use of black ink in place of the primary colors reduces expense and minimizes the total amount of ink used which is often desirable in ink-jet and other printing applications where the ability of the recording substrate to absorb ink is limited.

Methods for converting to the CMYK color space include those referred to as "under-color removal" (UCR) and "gray-component replacement" (GCR). UCR/GCR methods vary, but commonly involve examining the individual pixels of an image using the lowest or "darkest" of the three cyan-magenta-yellow colors to determine an amount of black to be added (Under-color Removal). One or more of the CMY colors are then adjusted to account for the addition of black ink (Grey Component Replacement). For example, if a given pixel of an image is represented in the CMY color space by C=0.5, M=0.4, and Y=0.25, then the black or K value would be based upon the lowest or Y value. In a 50% under-color removal (UCR) method, K=50% of Y=0.125. In a typical gray component replacement (GCR) step, the remaining CMY values would then each be reduced by 0.125 so that the resulting UCR/GCR pixel is represented by C=0.375, M=0.275, Y=0.125, and K=0.125. Of course, other UCR/GCR methods are known, but each seeks to determine the level of black for a given pixel, and to thereafter adjust the other colors accordingly to account for the addition of black ink.

In the digital processing of color images, the individual color separations are conveniently represented as monochromatic bitmaps, which may be described as an electronic image with a plurality of discrete elements (i.e. "pixels") defined by position and gray value. In such a system, gray value is described as one level in a number of possible states or levels. When more than two different levels are used in the description of an image, the levels are termed "gray" (without regard to the actual color) to indicate that the pixel value is between some maximum and minimum gray level. Most printing systems have the ability to reproduce an image with only a small number of gray values per pixel, most commonly two, although other numbers are possible. A printing system that is able to reproduce only two gray values for each pixel is said to produce binary output, i.e., the pixel is either "on" or "off."

On the other hand, image input devices, including digital cameras, scanners, and the like, are capable of describing each pixel of an image with many gray levels, for example 256 gray levels. Such input data is commonly called "continuous" or "contone" data. Accordingly, it is necessary that the input contone image (with many "gray" levels) be describable with the smaller set of gray levels reproducible by the output device in a manner that captures the intent of the user. In the digital reproduction of color images, this means that each of the color separations of the color-space must be reduced from the large number of continuous gray levels as input, to the smaller number of levels suitable for output. The multiple color separations are then combined together for printing to yield the final color print.

Given that common image output devices are "binary"—i.e., produce either "on" or "off" pixels for each color separation, it is necessary to employ half-toning techniques for each color separation to achieve the desired color within each separation before the color separations are combined for printing. Through half-toning, gray value variation within a color separation is represented by controlling the number of pixels that are "on" within a discrete area or cell of the separation. In such cases, the human eye and brain interpret the controlled number of "on" pixels in a halftone cell as a "gray level," with greater numbers of "on" pixels in a given cell or area being interpreted as more color. In theory, a human observer does not see the individual "on" and "off" pixels within a halftone cell, but instead sees an average amount of ink on paper. In practice, the effectiveness of half-toning methods varies.

Existing binary imaging systems do not allow for precise color classification and therefore a pixel will be either "color" or "neutral." In turn, transition from "color" to "neutral" in rendering of an image results in an and/or switching environment.

The above concept is illustrated in FIG. 1 which is intended to represent a full color sweep strip 10 from a saturated color (e.g. a chromaticity of 1.0) to a full neutral (e.g. a chromaticity of 0.0). It is appreciated that no actual color sweep is shown in the figure. Rather, the values 1.0 to 0.0 represent the amount of saturation which would exist at a particular color, as a color transitions from full saturation to full neutral. When in a color area 12 (between values 1.0 to 0.5), the CMYK contributions determine the output and, when in a black area 14 (less than 0.5) the output is strictly K or black. The transition from CMYK contribution to strictly K occurs at a specific switch-point 16, which results in a dramatic transition from the use of a four color mixture to black toner only. This transition point can be seen by the human eye and therefore results in an undesirable discontinuity of the color sweep.

In image rendering systems, which provide for black replacement, as shown in FIG. 2, there are two paths for converting the input, such as Lab to CMYK. It is to be noted that while the present discussion will focus on Lab and CMYK, the concepts may be extended to other color space models.

System 18 uses a black detection controller 20 to determine if input pixel information 22 is to be classified as neutral or color. For color pixels, an output from a sophisticated and expensive, non-linear conversion table 24, which has multiple inputs and outputs, is used for conversion to CMYK. When pixels are determined to be neutral, an output of a single TRC look-up table 26 is used which converts the L-channel of an input pixel information 22 to the K (black) channel, with CMY set to zero. The selection of which output to use in image formation is accomplished by switching unit 28, which is controlled by controller 20. Thus, system 18 is a switching type system wherein upon a determination of pixel information 22 as being one of color or neutral, a selection of the output from non-linear conversion table 24 or TRC look-up table 26 is made. It is appreciated other types of switching configurations could also be employed.

With the advent of fuzzy neutral detection, input pixels are not required to be restrictively or crisply defined as only neutral or color, but can have fuzzy memberships (0>1) in a neutral class. For example, in one embodiment input pixel information can be classified as 0.2 neutral (moderate color), as 0.7 (used to represent a weak color) or some other intermediate value.

Examples of fuzzy detection/classification systems include those described in U.S. Pat. No. 5,765,029 to Schweid, et al., A METHOD AND SYSTEM FOR FUZZY IMAGE CLASSIFICATION; U.S. Pat. No. 5,778,156 to Schweid et al., A METHOD AND SYSTEM FOR IMPLEMENTING FUZZY IMAGE PROCESSING OF IMAGE DATA, both hereby incorporated by reference. Color conversion and under-color removal techniques are described in U.S. Pat. No. 5,515,172 to Shiau, APPARATUS AND METHOD FOR ENHANCED COLOR TO COLOR CONVERSION, U.S. Pat. No. 5,359,437 to Hiba, METHOD FOR UNDERCOLOR REMOVAL IN COLOR IMAGE FORMING APPARATUS; and U.S. Pat. No. 5,146,328 to Yamasaki et al., COLOR SIGNAL NETWORK SYSTEM, all hereby incorporated by reference.

One mechanism for using fuzzy neutral detected information during the rendering process, including the conversion of an input pixel into CMYK, is to use several non-linear full conversion tables. Particularly, individual tables may be designed allowing different percentages of under-color removal. For example, a table corresponding to a conversion when fuzzy membership in the neutral class is 0.5 could be generated which generates 50% under-color removal. The inputted fuzzy neutral pixel could then be quantitized to an equal number of levels as there are tables. For example, five tables can be designed corresponding to 0, 33, 50, 66, and 100% under-color removal, for fuzzy neutral membership quantitized to 0, 0.33, 0.50, 0.66 and 1.0. Thereafter, the table reflecting the detected fuzzy classification of the input pixel information is chosen for appropriate conversion.

However, the foregoing proposal is costly since it requires the use of several expensive non-linear transformations, usually in the form of interpolated look-up tables.

Therefore, in an environment where fuzzy color detection/classification of pixel data has occurred such that there has been a smooth transition with respect to pixel detection values, it is considered useful to provide an economic, easy to implement manner of rendering an image, including a variable under-color removal scheme.

In this environment, the present invention determines a manner of using information which will describe a color classification other than "color" or "neutral" to produce a full-color transition without a single switching point at the transition to neutral or full black.

SUMMARY OF THE INVENTION

A color conversion table is designed to receive a plurality of color input signals of a first color space model and convert the signals to output color signals in a second color space model. A tone reproduction curve table (TRC) is designed to receive at least one input signal which is the same as at least one input signal of the color conversion table. The color conversion table and the TRC are designed as a matched pair. A first weight $w_1$, and a second weight $w_2$, are held in a relationship to each other of $w_1+w_2=x$. A first multiplier in operative connection with the color conversion table incorporates the first weight value of the first weight, $w_1$, wherein the outputs from the color conversion table are multiplied by the first weight value, generating weighted color conversion output signals. A second multiplier is in operative connection with the TRC, and incorporates a second weight value of the second weight, $w_2$. The output of the TRC is multiplied by the second weight value, thereby generating a weighted TRC output signal. An adder is placed in operative connection with the first multiplier and the second multiplier, wherein the weighted color conversion output signals and the weighted TRC output signal are combined. A fuzzy white detector/classifier is used to supply the first weight to the first multiplier and to supply the second weight to the second multiplier. The combined weighted color conversion output signals and the weighted TRC output signals is represented by $w*C_0$, $w*M_0$, $w*Y_0$, $w*K_0+(1-w)*K_{100}$, when the conversion of the input color is to a CMYK color space.

DETAILED DESCRIPTION OF THE PREFERRED EMBODIMENTS

Figure 1:
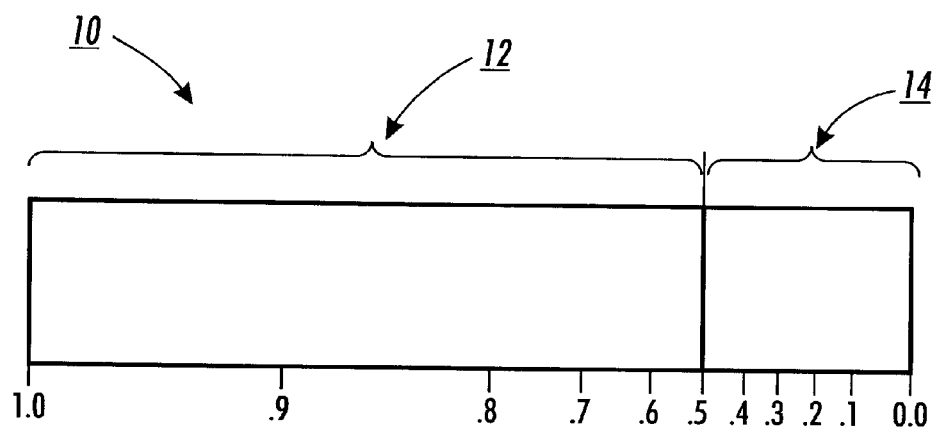
FIG. 1 shows a color sweep from full-color to neutral.
Figure 2:
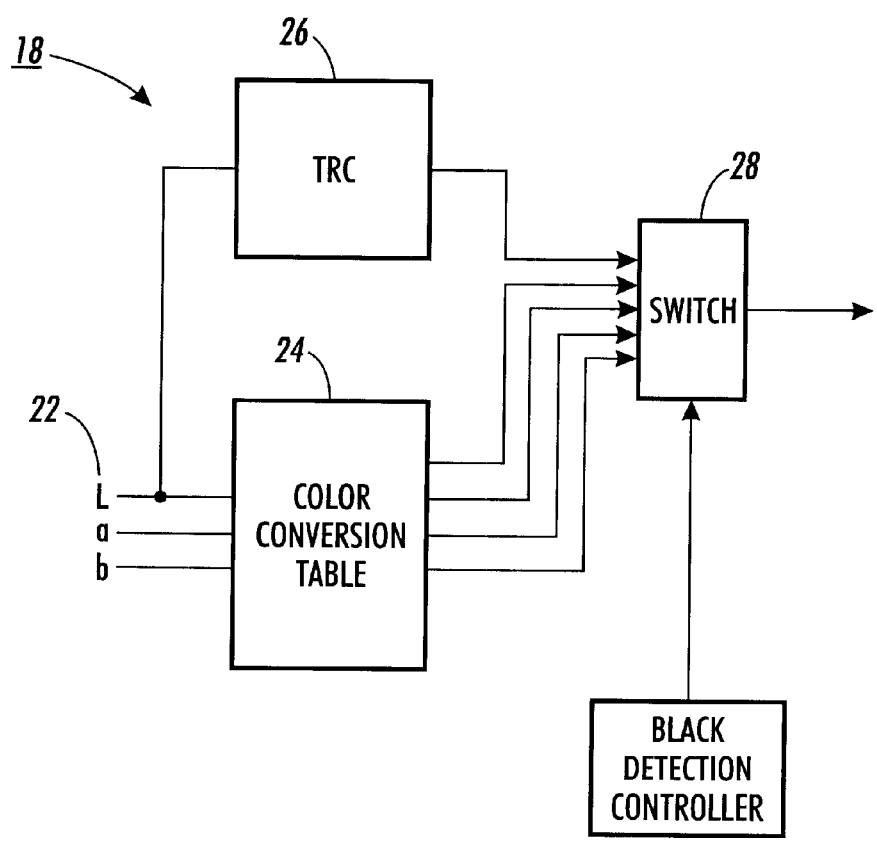
FIG. 2 depicts a switching network between a color conversion table and a tone reproduction curve table when converting between color spaces.

FIG. 1 illustrated a full-color sweep from a saturated color to a neutral color in a system where a binary classification of input pixels between "full color" and "neutral" exist. FIG. 2 depicts a color conversion system which switches between use of a non-linear conversion device and a TRC table, during the color conversion process.

Figure 3:
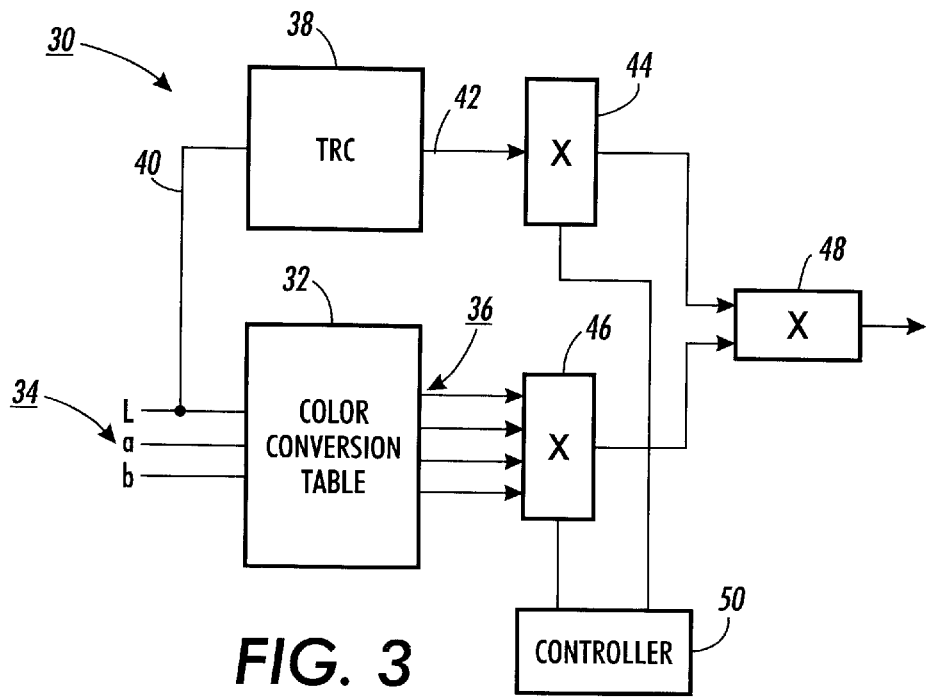
FIG. 3 illustrates a variable under-color correction system according to the teachings of the present invention.

Turning to FIG. 3, an image rendering and variable under-color correction system 30 according to one embodiment of the present invention is illustrated, using an example of converting from an Lab color space to a CMYK color space. System 30 includes color conversion table 32 with multiple inputs 34 and multiple outputs 36. A tone reproduction curve TRC table 38 is configured, as shown in the drawings for convenience, to have an input 40, which shares an L-input with color conversion table 32, and an output 42.

Outputs 36 and 42 are supplied, respectively, to multipliers 44. The outputs of multipliers 44 and 46 are then added by adder 48 to generate outputs. A weight detector/classifier 50 supplies weight values to multipliers 44.

Thus, in an embodiment of the present invention, color conversion table 32 is designed to input Lab color values and output CMYK values. Further, TRC 38 is designed to receive the L input of Lab values which results in an output of K (i.e. black output where CMY=0).

An aspect of implementing system 30, is the need to generate color conversion table 32 and TRC 38 such that they are a matched pair. Particularly, for color conversion table 32 it is understood that if a and b of a Lab input are set equal to 0, a "neutral" output which is the black "K" output of CMYK will occur.

For the present invention it is necessary that when a and b are equal to 0, the visual appearance of the CMYK output from color conversion table 32 be reflected as close as possible by the K-only rendering of TRC 38. It is to be understood that there may be some difference due to the color conversion table 32 not being ideal and therefore not outputting a pure neutral, in addition to other physical limitations of creating a pure black. However, by varying testing methods which are known in the art, it is possible to obtain the TRC output to be substantially equivalent to the output from color conversion table 32 when a and b are equal to 0.

An initial reason color conversion table 32 and TRC 38 must be a matched pair is to minimize color shifts in printed images. If the TRC 38 incorporates a different system from color conversion table 32, color shifts will occur in the fuzzy region, where membership is between 0 and 1. In addition, if the fuzzy neutral membership varies between two very similar input colors, the corresponding output colors will have noticeable differences if the two color correction schemes are not matched.

In order to minimize these defects, in one embodiment TRC 38 is created using the output of color conversion table 32. A neutral target (e.g. where the ab chrominance planes of Lab are set to 0) is presented to the color conversion table 32. The four-color output (CMYK) is then printed and the corresponding luminance is measured at each point. TRC 38 is generated so the measured luminance of the output of color conversion table 32 and the output of TRC 38 are substantially identical.

Figure 4:
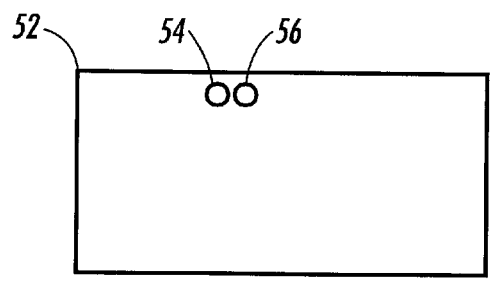
FIG. 4 depicts a pixel generated from a matched color conversion table and a pixel from a TRC table.

For example, image 52 of FIG. 4 shows pixel 54 and pixel 56 side-by-side. If the pixel values used to generate pixel 54 and pixel 56 are substantially identical, but pixel 54 is generated through manipulation of color conversion table 32, and pixel 56 is generated by manipulation of TRC 38, to a viewer, the output colors should be substantially identical. This would indicate that a successful matching of color conversion table 32 and TRC 38 has been accomplished.

In one embodiment, the matched pair is generated by producing an ideal color conversion table and an ideal linearized TRC which would, by definition be a matched pair. However, this does not have to happen. Any table can be used, in particular, it does not need to be a linearized table, all that is necessary is that the TRC matches the color conversion table output for a selected Lab output. (i.e. when Lab=L00). For example, when color conversion table 32 receives an L00 input, instead of obtaining an L out, table 32 could output an L2 (i.e., an L different from the input L is obtained). It does not matter that L2 is not matched to the input L. Rather, what is necessary is that upon the generation of the TRC, L input to the TRC also results in an output of L2. Therefore, while presently it is possible to create the matching pair by using a linearizing TRC and a linearizing table (i.e. also called an inversion table) it is also possible to generate a matching pair which are not linearized.

Once the matched pair (i.e. the color conversion table 32 and TRC 38) is generated, the concept of using fuzzy neutral information in a rendering scheme is addressed. In particular the matched pair is implemented with weighed output combinations to create neutral color output on a pixel-by-pixel basis without switching among a number of different color conversion tables.

With attention to FIG. 3, system 30 addresses a situation where a fuzzy detected color value is in between "color" and "neutral", and provides a scheme to render an appropriate output. The output is obtained in an embodiment of the present invention by forming weighted combinations of the outputs of the matched pair, i.e. color conversion table 32 and TRC 38.

For the following explanation, the output of color conversion table 32 is designated, $O_1$, 36, the output of TRC 38 is designated $O_2$, 42. Output $O_1$, 36, is then multiplied by multiplier 46, supplied with weight values (for color conversion table 32) by weight detector/classifier 50, and output $O_2$, 42, is multiplied by multiplier 44 supplied with weigh values (for TRC 38) by weight detector/classifier 50. Depending on the value of an incoming neutral tag for a pixel, varying weighted output averages of the color conversion table 32 and TRC 38 are generated. Use of the generated outputs allow for a smooth transition from full color to neutral or monochrome, as well as various amounts of under-color removal using only a single color conversion table and a TRC. If the weight supplied to the color conversion table 32, designated $w_1$, and the weight supplied to the TRC 38, designated $w_2$, are limited in accordance with, $$w_1 + w_2 = 1,$$

then the overall system output may be defined by, $$(O_1 * w_1) + (O_2 * w_2)$$

Thus, in the present invention the outputs of the two conversion devices are combined via a weighting scheme, rather than being switched between color conversion table 24 and TRC 26, at a defined switching point.

It is noted that color conversion table 32 is constructed to have 0% under-color removal, whereas TRC 38 is constructed with 100% under-color removal.

If the output of the color conversion table has 0% under-color removal designated as $C_0$, $M_0$, $Y_0$, $K_0$, and the output of the L to K TRC is $K_{100}$, then the output (i.e. CMYK values) of the fuzzy color conversion may be more particularly defined as:

$$w * C_0 w * M_0 Y_0 w * K_0 + (1-w) * K_{100},$$

where w is a scalar or weight that is a function of the fuzzy neutral membership.

TRC 38 is known to be used in generation of images for monochrome printers, which in system 30 would therefore mean the path through TRC 38 would be used for such equivalently detected values. If a full color page is to be rendered, then the color conversion table 32 would be fully used. The present invention combines these two concepts in an additive, accumulative manner rather than a switching manner.

Multiplying the outputs of color conversion table 32 and TRC 38, with weights, and then combining the outputs of color conversion table 32 (0% under-color removal) and TRC 38 (100% under-color removal) provide variable under-color removal capabilities.

When Lab values represent a full color situation, $w_1$ equals 1 and $w_2$ equals 0, causing contribution to the output color to be fully through color conversion table 32. If Lab values represent a full neutral (pure black) situation, $w_1$ equals 0 and $w_2$ equals 1, causing contribution to the output color to be fully through TRC 38. The present invention, however, also addresses situations where the input color for Lab is detected as being some value representing a color between the pure color and pure neutral classifications. In these situations a weighted combination of color conversion table 32 and TRC 38 are used to produce the output.

Therefore, the embodiment of FIG. 3 illustrates that in a system with a matched color conversion table 32 and TRC 38, when a weighted combination is taken, and if there is a fuzzy definition of neutral to color, as values progress from full color to full neutral (i.e. black), a smooth color transition is achieved instead of a switching at a defined point.

The variable under-color removal aspects are seen, for example, when a and b of Lab move near 0. Particularly, if an area of an image is to have near 100% undercolor removal as a and b approach 0, operation of system 30 will move toward weightings which increase the contribution of TRC 38 compared to the contribution from color conversion table 32. When the a,b values of Lab information are found to move away from 0, a greater contribution is provided from color conversion table 32, lowering the percentage of under-color removal. This design is used to accomplish variable under-color removal percentages, which would otherwise require multiple color conversion tables each having their own percentage of under-color removal.

Thus, in one embodiment of the present invention weighted combinations of the table 32 and TRC 38 output are taken as an estimate of different under-color removal processes and as a way to render fuzzy neutral data, i.e. a way to implement neutral detection algorithms that have non-binary inputs.

By weighting the outputs of color conversion table 32 and TRC 38, and including two multipliers 44, 46 and an adder 48, an under-color removal system with varying percentages for a weighting of the neutral detection algorithm that have non-binary inputs is obtained. The higher the values of a and b, the higher the weighting averages will be on color conversion table 32, and the lower the values of a and b, the higher the weighting averages will be on TRC 38.

Figure 5:
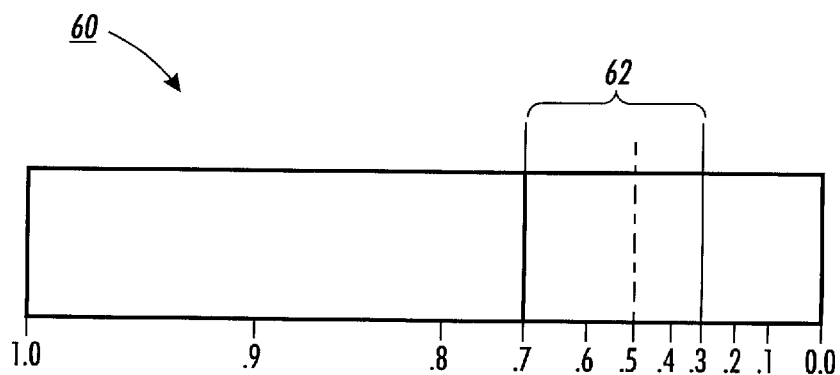
FIG. 5 shows a full-color sweep in accordance with the concepts of the present invention.

Concepts of the foregoing are illustrated by FIG. 5, which similar to FIG. 1, depicts a color sweep 60 from a full saturated color to a full neutral, where full saturation occurs at 1.0 chromanence and full neutral occurs at 0.0 chromanence. As may be recalled from FIG. 1, previous systems have a defined switch point 16, between a full-color region (i.e. contribution is from color conversion table 32) and a full neutral region (i.e. contribution is from TRC 38). By implementing the concepts of the present invention, a transition region (e.g. from 0.7 to 0.3) exists where weighted combinations of the outputs of color conversion table 32 and TRC 38 are used for image generation. Rendering an image using this procedure provides a smooth transition from a full color to full neutral, and generates an image where a single switch point does not exist. Rather, transition region 62 surrounds switch point 16. Within transition region 62 a weighted signal, represented by $C_0M_0Y_0K_0$ and $K_{100}$ is used in image generation.

Thus, the present invention takes advantage of defining colors in fuzzy classifications, i.e. "strong", "mild", "weak", etc., when provided with corresponding values, and uses these classifications in the image rendering process. In this manner a smooth transition of a color sweep is obtained, without a single transition switching point. It is to be appreciated that various weighting values can be used in the present invention.

The assignment of weights between color conversion table 32 and TRC 38, while limited to $w_1+w_2=1$, does not require that a 1 to 1 matching between a weight value and the percentage of color removal. Rather, the weighting applied within this restriction is alterable, dependent upon configuration of the system. For example, while $w_{1would}$ equal 1 in a pure color situation, and $w_2$ would equal 1 in a full neutral situation, ranges within this restriction can be alterable, i.e., the transition rate is variable. For example, a 50% under-color removal does not necessarily mean $w_1$ and $w_2$ both must be weighted at 0.5. It may be determined that for the mid-gray or mid-neutral under-color removal something other than 50% is desirable. For example, an embodiment of the present invention can be designed where a weighting of 0.5 for both $w_1$ and $w_2$ would result in 40%, 60%, or some other percentage of under-color removal, or, as another example, a weighting of $w_1=0.7$, $w_2=0.3$ could result in 35%, 45% or 60% under-color removal. It is to be understood that the above are only examples, and the relationship between weighting and percentage of under-color removal is determined based on the configuration of color conversion table 32 and TRC 38.

While the invention has been described with reference to various embodiments disclosed above, it is not confined to the details set forth above, but is intended to cover such modifications or changes as may come within the scope of the attached claims.

What is claimed is:

1. A color conversion apparatus comprising:

a color conversion table designed to receive a plurality of color input signals of a first color space model and to output color signals in a second color space model, based on the inputted signals;

a tone reproduction curve (TRC) table designed to input at least one input signal which is the same as at least one input signal of the color conversion table;

a first weight, $w_1$;

a second weight, $w_2$, wherein the first weight and the second weight are held in a relationship to each other of, $w_1+w_2=x$, wherein x is a predetermined value;

a first multiplier in operative connection with the color conversion table, the first multiplier incorporating a first weight value of the first weight, wherein the outputs of the color conversion table are multiplied by the first weight value, generating weighted color conversion output signals;

a second multiplier in operative connection with the TRC table, the second multiplier incorporating a second weight value of the second weight, wherein the output signal of the TRC table is multiplied by the second weight value, generating a weighted TRC output signal; and an adder in operative connection with the first multiplier and the second multiplier, wherein the weighted color conversion output signals and the weighted TRC output signal are combined to form an output used in an image rendering operation of an image rendering system.

2. The invention of claim 1 wherein the color conversion table and the TRC are designed as a matched pair.

3. The invention of claim 2 wherein the color conversion table is an idealized linearized table and the TRC is a linearized table.

4. The invention of claim 1 further including a fuzzy weight detector/classifier which supplies the first weight to the first multiplier and supplies the second weight to the second multiplier.

5. The invention of claim 1 wherein $w_1+w_2=1$.

6. The invention of claim 1 wherein the combined weighted color conversion output signals and the weighted TRC output signal is represented by:

$$w*C_0, w*M_0, w*Y_0, w*K_0+(1-w)*K_{100},$$

when conversion of an input color is to a CMYK color space, where Co, Mo, Yo and Ko are representative of CMYK values when the color conversion table has 0% under-color removal.

7. The invention of claim 1 wherein the weighted color conversion output signal is:

$$w*C_0, w*M_0, w*K_0,$$

when conversion of an input color is to a CMYK color space.

8. The invention of claim 1 wherein the weighted TRC output signal is:

$$(1-w)*K_{100},$$

when conversion of an input color is to a CMYK color space.

9. The invention of claim 1 wherein the color conversion table and the TRC are designed such that a weighting value of one of $w_1$ and $w_2$, is substantially equal to a percentage of under-color removal.

10. The invention of claim 1 wherein the color conversion table and the TRC are designed such that a weighting value of one of $w_1$ and $w_2$ results in a percentage of under-color removal substantially different from the weighting values.

11. The invention of claim 1, wherein the color conversion table receives Lab inputs and outputs CMYK values, and the TRC receives the L input of the Lab.

12. The method of claim 1 wherein the predetermined value is an integer.

13. A method of rendering an image whose image signals are based on a fuzzy classification;

inputting image information into a color conversion table, the image information being in a first color space model;

inputting image information into a tone reproduction curve (TRC) table, the image information inputted into the TRC table being the same as at least a portion of the image information input into the color conversion table;

supplying a first weight value to a multiplier in operative connection with the color conversion table;

supplying a second weight value to a second multiplier in operative connection with the TRC table;

limiting the relationship of the first weight value and the second weight value such that, first weight+second weight=x, wherein x is a predetermined value;

converting the image information input into the color conversion table, in the first color space model, to output color conversion image information in a second color space model;

converting the inputted image information, into TRC output image information;

multiplying the output color conversion information by the first weight value to obtain a weighted color conversion output;

multiplying the output TRC conversion information by the second weight value to obtain a weighted TRC output; and adding the weighted color conversion output and the TRC output to obtain image rendering information used to generate an image in an image rendering operation of an image rendering system.

14. The method of claim 13 further including designing the color conversion table and the TRC as a matched pair.

15. The method of claim 13 wherein the steps of:

supplying the first weight value to the multiplier in operative connection with the color conversion table, includes supplying the first weight value from a fuzzy detection/classification unit; and supplying the second weight value to the multiplier in operative connection the TRC includes supplying the second weight value from the fuzzy detection/classification unit.

16. The method of claim 13 wherein image rendering information is used to perform under-color removal processing.

17. The method of claim 16 wherein a percentage of under-color removal is dependent upon the design of the color conversion table and the TRC.

18. The method of claim 13 wherein the predetermined value is an integer.

* * * * *